Patented Feb. 5, 1952

2,584,589

UNITED STATES PATENT OFFICE 2,584,589

PREPARATION OF DIACYL 1,3-AMINO ALCOHOLS AND THEIR HYDROLYZED PRODUCTS, 1,3-AMINO ALCOHOLS

Edward Levant Jenner, Wilmington, Del., assignor to E. I. du Pont de Nemours & Company, Wilmington, Del., a corporation of Delaware No Drawing. Application September 27, 1948, Serial No. 51,485

12 Claims. (Cl. 260—570.6)

This invention relates to 1,3-amino alcohols and to their diacyl derivatives. More particularly this invention relates to a new type of chemical reaction and method for preparing 1,3-amino alcohols and their diacyl derivatives.

Heretofore there existed no satisfactory general method of preparing 1,3-amino alcohols. These compounds are of considerable interest, particularly in the form of their esters, because of their physiological activity. However, their study and development have been hampered by the lack of a convenient and economical synthesis.

It is an object of the present invention to provide a new type of chemical reaction and method for preparing 1,3-amino alcohols and their diacyl derivatives. A further object is to provide a satisfactory general method of preparing 1,3-amino alcohols by a convenient and economical synthesis. A still further object is to prepare new 1,3-amino alcohols. Other objects will appear hereinafter.

The objects of this invention are accomplished by a process which comprises reacting an ethylenically unsaturated hydrocarbon with formaldehyde and an ethylenically saturated mononitrile in the presence of at least molar amounts, with respect to each double bond of said ethylenically unsaturated hydrocarbon, of an oxygen-containing acid whose dissociation constant in absolute ethanol is greater than 0.001 and of an ethylenically saturated monocarboxylic acid. The resulting intermediate product is hydrolyzed to the diacylated 1,3-amino alcohol, which in turn may be hydrolyzed to the 1,3-amino alcohol. It has now been found that 1,3-amino alcohols can be prepared by this new type of reaction which is represented by the following equation:

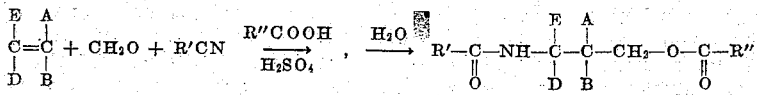

wherein A, B, D and E are hydrogen atoms or hydrocarbon radicals, R' is an ethylenically saturated hydrocarbon radical and R'' is hydrogen or an ethylenically saturated hydrocarbon radical. In the cases where any of A, B, D and E are hydrogen, the acylamino group becomes attached to the carbon atom bearing the lesser number of hydrogen atoms. The primary reaction product is probably an acyl derivative of an imide, i. e., it has the group

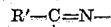

which upon mild hydrolysis is converted to the acylamino group, R'—CO—NH—. There is thus obtained as the reaction product a 1,3-amino alcohol wherein both the amino and hydroxyl groups are acylated, i. e., a compound containing a (1-acylamino-3-acyloxy)propyl group. This diacyl derivative is then hydrolyzed to the corresponding 1,3-amino alcohol of the formula

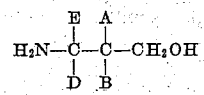

wherein A, B, D and E are hydrogen atoms or hydrocarbon radicals.

The reactants which add to the double bond, that is, the nitrile and the formaldehyde, are preferably used in substantially equivalent amounts with respect to the ethylenic hydrocarbon, i. e., one mole of nitrile and one mole of formaldehyde for each ethylenic double bond. A slight excess of one or the other does no harm, however. The saturated carboxylic acid may also be used in equivalent amount but it is generally preferable to use an excess of it, for example 3 to 10 times the molar amount, so that it may serve as diluent and reaction medium. The acid catalyst, that is the acid whose dissociation constant in absolute ethanol is greater than 0.001, should be used in at least molar amounts (one mole per double bond) and it is desirably used in excess, for example 10% to 100%, over the molar amount. Since the reaction is exothermic, it is preferable to add separately the ethylenic compound and the acid catalyst gradually to the other reactants.

The formaldehyde may be introduced in the gaseous form but it is more convenient to use a formaldehyde-yielding solid such as paraformaldehyde or trioxane, or even an aqueous solution of formaldehyde since the reaction medium need not be strictly anhydrous and can tolerate some water, up to 10–20% by weight of the total reaction mixture.

The reaction is preferably carried out at low or moderate temperature, e. g., between 0 and 50° C. With the less reactive ethylenic hydrocarbons, it may be desirable to go as high as 100° C. or even higher. When volatile reactants are used the reaction is conducted in a sealed, pressure-resistant vessel. The optimum reaction time depends on the reactivity of the various ingredients. In general, it is sufficient to maintain the reaction mixture at 20–50° C. for 2–8 hours after the first exothermic reaction has ceased.

The addition product, that is, the diacyl derivative of the 1,3-amino alcohol, is most conveniently isolated by making the mixture slightly alkaline, whereupon the primary reaction product is hydrolyzed and the diacyl compound separates and can be distilled and/or crystallized prior to hydrolysis. If purity of the amino alcohol is not essential, the addition product may be hydrolyzed to the amino alcohol as it is first obtained, without preliminary distillation or crystallization. The hydrolytic step to the amino alcohol is best carried out in aqueous or alcoholic alkaline media, using for example sodium or potassium hydroxide as the hydrolytic agent.

The process is illustrated in detail in the following example, in which parts are by weight.

Example

To a solution of 8.2 parts of acetonitrile in 52 parts of glacial acetic acid, stirred and cooled to 5° C., was added simultaneously and at approximately equivalent rates 20.8 parts of styrene and a solution of 6.8 parts of paraformaldehyde in 31 parts of concentrated sulfuric acid. The temperature rose to 25° C. during the addition of these reactants. The resulting solution was stirred at 15–25° C. for 2 hours and allowed to stand at about 20° C. for 16 hours.

The resulting viscous solution was poured onto cracked ice, made slightly alkaline with 10% sodium hydroxide at 0–5° C., and the oil which separated was taken up in chloroform. After drying over magnesium sulfate, the chloroform was removed by distillation and the residue was fractionated at reduced pressure. About 8 parts of distillate boiled between 103 and 180° C. at 1 mm. pressure. Then there was obtained 11.8 parts of product distilling at 180–188° C. at 1 mm. pressure. This material solidified on cooling. After two recrystallizations from ether, it was a white crystalline solid melting at 84–85° C. Analysis showed it to be 1-acetamino-1-phenyl-3-acetoxypropane,

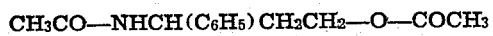

$CH_3CO\text{—}NHCH(C_6H_5)CH_2CH_2\text{—}O\text{—}COCH_3$

Analyses: Calc'd. for $C_{13}H_{17}O_3N$: C, 66.36; H, 7.28; N, 5.95.
Found: C, 66.61, 66.52; H, 7.38, 7.32; N, 5.85, 5.81.

The free amino alcohol was prepared by refluxing 1.2 parts of its diacetate with 12 parts of 15% aqueous sodium hydroxide for one hour. The hydrolysis mixture was extracted with benzene and the benzene extract was dried over magnesium sulfate. After most of the benzene had been removed by distillation, petroleum ether was added to the remainder, whereupon the solid 1-amino-1-phenyl-3-propanol separated. Recrystallization from a mixture of benzene and petroleum ether gave the amino alcohol as a white microcrystalline solid melting at 73–74° C.

Analyses: Calc'd. for $C_9H_{13}OH$; C, 71.49; H, 8.67; N, 9.28.
Found: C, 71.63; H, 8.69; N, 9.07.

By treatment of an aqueous solution of the amino alcohol with benzoyl chloride in the presence of sodium hydroxide, there was obtained 1-benzamido-1-phenyl-3-benzoxypropane, a crystalline solid melting at 116–117° C. after crystallization from ethanol and water.

Analyses: Calc'd. for $C_{23}H_{21}O_3N$: C, 76.86; H, 5.89; N, 3.90.
Found: C, 77.09; H, 6.09; N, 3.87.

While the process has been illustrated with styrene, it is equally applicable to any ethylenically unsaturated hydrocarbon, including for example ethylene, propylene, 1-butene, 2-butene, 1,3-butadiene, isoprene, 3-hexene, 1-octene, 1-decene, 1-hexadecene, 1-octadecene, cyclohexene, divinylbenzene, vinylnaphthalene and the like. In the case of 1,3-dienes both 1,2- and 1,4- addition may occur. The preferred starting materials are the unsaturated hydrocarbons having from 3 to 8 carbon atoms and having only one ethylenic double bond, since such materials are readily available and lend themselves well to this type of reaction.

Any ethylenically saturated mononitrile is suitable, including for example propionitrile, butyronitrile, valeronitrile, caprylonitrile, lauronitrile, stearonitrile, benzonitrile and the like. Since the ultimate goal of the process is the preparation of the free 1,3-amino alcohol, which involves hydrolysis of the acyl radicals, it is desirable to use an available and economical nitrile. For this reason the preferred nitriles are those having from 2 to 8 carbons and which, apart from the nitrile group, are hydrocarbon. Particularly preferred are the alkyl mononitriles of from 2 to 8 carbon atoms. Likewise, there may be used any ethylenically saturated monocarboxylic acid, including formic acid, propionic acid, butyric acid, isobutyric acid, caproic acid, caprylic acid, lauric acid, stearic acid, benzoic acid, cyclohexanecarboxylic acid and the like, and for the same reason it is preferred to use acids having from 1 to 8 carbons and which, apart from the carboxyl group, are hydrocarbon. Particularly preferred are the alkyl monocarboxylic acids having from 1 to 8 carbon atoms.

As the acid catalyst there may be used any oxygen-containing acid whose dissociation constant in absolute ethanol is greater than 0.001 (see A. J. Deyrup, J. Am. Chem. Soc. 56, 63 (1934) and L. P. Hammett, Physical Organic Chemistry, McGraw-Hill Book Company (1940), p. 261). These are very strong acids which include, for example sulfuric acid, perchloric acid, fluosulfonic acid, methanetrisulfonic acid, benzenesulfonic acid, toluenesulfonic acid, methanesulfonic acid, ethanesulfonic acid, monoesters of sulfuric acid such as methyl hydrogen sulfate and butyl hydrogen sulfate, difluophosphoric acid, chlorosulfonic acid and the complexes of boron trifluoride with alkanoic acids of one to six carbons, such as $BF_3 \cdot CH_3COOH$. Of these catalysts, sulfuric acid is perhaps the most generally useful, as well as the cheapest.

The 1,3-amino alcohols and their diacyl derivatives are of special interest in the pharmaceutical field, for example as anesthetics. They are also useful in other fields, for example as plasticizers, and as intermediates in chemical syntheses.

As many apparently widely different embodiments of this invention may be made without departing from the spirit and scope thereof, it is to be understood that this invention is not limited to the specific embodiments thereof except as defined in the appended claims.

I claim:
1. A process which comprises reacting, at a temperature of 0° to 100° C., a monoethylenically unsaturated hydrocarbon of from 3 to 8 carbon atoms having a single ethylenic double bond as the sole aliphatic carbon-to-carbon unsaturation with molar equivalent amounts, with respect to said unsaturated hydrocarbon, of formaldehyde and of an alkyl mononitrile of from 2 to 8 carbon atoms, in the presence of at least molar equivalent amounts, with respect to said unsaturated hydrocarbon of an oxygen-containing strong acid whose dissociation constant in absolute ethanol is greater than 0.001 and of an alkyl monocarboxylic acid of from 1 to 8 carbon atoms.

2. A process as set forth in claim 1 in which a diacyl 1,3-amino alcohol is separated as the resulting reaction product.

3. A process as set forth in claim 1 in which the resulting reaction product is hydrolyzed to the 1,3-amino alchol.

4. A process which comprises reacting, at a temperature of 0° to 100° C., a monoethylenically unsaturated hydrocarbon of from 3 to 8 carbon atoms having a single ethylenic double bond as the sole aliphatic carbon-to-carbon unsaturation with molar equivalent amounts, with respect to said unsaturated hydrocarbon, of formaldehyde and of an alkyl mononitrile of from 2 to 8 carbon atoms, in the presence of at least molar equivalent amounts, with respect to said unsaturated hydrocarbon, of sulfuric acid and of an alkyl monocarboxylic acid of from 1 to 8 carbon atoms.

5. A process as set forth in claim 4 in which a diacyl 1,3-amino alcohol is separated as the resulting reaction product.

6. A process as set forth in claim 4 in which the resulting reaction product is hydrolyzed to the 1,3-amino alcohol.

7. A process which comprises reacting, at a temperature of 0° to 100° C., styrene with molar equivalent amounts, with respect to said styrene, of formaldehyde and of acetonitrile, in the presence of at least molar equivalent amounts, with respect to said styrene, of sulfuric acid and of acetic acid.

8. A process as set forth in claim 7 in which 1-acetamino-1-phenyl-3-acetoxypropane is separated as the resulting reaction product.

9. A process as set forth in claim 7 in which the resulting reaction product is hydrolyzed to 1-amino-1-phenyl-3-propanol.

10. A process as set forth in claim 1 wherein said alkyl monocarboxylic acid is acetic acid.

11. A process as set forth in claim 1 wherein said alkyl mononitrile is acetonitrile.

12. A process as set forth in claim 1 wherein said monoethylenically unsaturated hydrocarbon is styrene.

EDWARD LEVANT JENNER.

REFERENCES CITED

The following references are of record in the file of this patent:

UNITED STATES PATENTS

| Number | Name | Date |
| --- | --- | --- |
| 2,160,138 | Gaylor | May 30, 1939 |
| 2,229,187 | Peyer | Jan. 21, 1941 |
| 2,243,295 | Susie | May 27, 1941 |